US008947408B2

(12) United States Patent
Lin et al.

(10) Patent No.: US 8,947,408 B2
(45) Date of Patent: Feb. 3, 2015

(54) SOURCE DRIVER AND METHOD FOR UPDATING A GAMMA CURVE

(71) Applicant: Novatek Microelectronics Corp., Hsinchu (TW)

(72) Inventors: Jr-Ching Lin, Hsinchu (TW); Hsin-Hung Lee, Kaohsiung (TW); Chia-Wei Su, Hsinchu (TW); Po-Yu Tseng, Taoyuan County (TW); Shun-Hsun Yang, Hsinchu (TW); Po-Hsiang Fang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 183 days.

(21) Appl. No.: 13/677,314

(22) Filed: Nov. 15, 2012

(65) Prior Publication Data

US 2014/0071106 A1 Mar. 13, 2014

(30) Foreign Application Priority Data

Sep. 13, 2012 (TW) .............................. 101133543 A

(51) Int. Cl.
*G06F 3/038* (2013.01)
*G09G 1/00* (2006.01)
*G09G 3/36* (2006.01)

(52) U.S. Cl.
CPC .............. *G09G 1/005* (2013.01); *G09G 3/3688* (2013.01); *G09G 3/3696* (2013.01); *G09G 2320/0673* (2013.01)
USPC .......................................................... 345/204

(58) Field of Classification Search
USPC ...................... 345/88, 89, 204, 211, 212, 690
See application file for complete search history.

(56) References Cited

U.S. PATENT DOCUMENTS

| | | | | |
|---|---|---|---|---|
| 6,593,934 | B1 * | 7/2003 | Yang et al. | 345/590 |
| 8,581,898 | B2 * | 11/2013 | Lee | 345/212 |
| 8,599,224 | B2 * | 12/2013 | Yoo et al. | 345/690 |
| 8,687,025 | B2 * | 4/2014 | Lee et al. | 345/690 |
| 2003/0142084 | A1 * | 7/2003 | Chang et al. | 345/204 |

(Continued)

FOREIGN PATENT DOCUMENTS

| | | |
|---|---|---|
| TW | 200401251 | 1/2004 |
| TW | 201113856 | 4/2011 |
| TW | 201126490 | 8/2011 |

OTHER PUBLICATIONS

"Office Action of Taiwan Counterpart Application", issued on Jul. 9, 2014, p. 1-p. 8.

*Primary Examiner* — Rodney Amadiz
(74) *Attorney, Agent, or Firm* — Jianq Chyun IP Office

(57) ABSTRACT

A source driver includes a first drive channel circuit, a voltage controller and a first programmable voltage buffer unit. The first drive channel circuit receives a first pixel data from the timing controller via a data bus, converts the first pixel data to a first drive voltage according to a first reference voltage group, and drives a display panel by the first drive voltage. The voltage controller receives a voltage command from the timing controller, generates and changes a first reference voltage configuration data according to the voltage command. The first programmable voltage buffer unit is coupled to the voltage controller and the first drive channel circuit, and receives the first reference voltage configuration data to generate and adjust the first reference voltage group for applying to the first drive channel circuit. Furthermore, a method for updating a new gamma curve by the source driver is also provided.

17 Claims, 9 Drawing Sheets

(56) References Cited

U.S. PATENT DOCUMENTS

| | | | | |
|---|---|---|---|---|
| 2005/0200615 | A1* | 9/2005 | Lin | 345/204 |
| 2007/0139328 | A1* | 6/2007 | Lan | 345/89 |
| 2008/0266331 | A1* | 10/2008 | Chen et al. | 345/690 |
| 2011/0157129 | A1 | 6/2011 | Song et al. | |
| 2011/0216056 | A1* | 9/2011 | Yoo et al. | 345/212 |
| 2012/0139970 | A1* | 6/2012 | Kim | 345/690 |
| 2012/0154462 | A1* | 6/2012 | Hempson et al. | 345/691 |

* cited by examiner

SOURCE DRIVER AND METHOD FOR UPDATING A GAMMA CURVE

CROSS-REFERENCE TO RELATED APPLICATION

This application claims the priority benefit of Taiwan application serial no. 101133543, filed on Sep. 13, 2012. The entirety of the above-mentioned patent application is hereby incorporated by reference herein and made a part of this specification.

FIELD OF THE INVENTION

The invention relates to a display apparatus, and more particularly, to a source driver combining with a programmable voltage buffer unit and a method for updating a gamma curve using the same.

BACKGROUND

In the field of liquid crystal display (LCD) technology, a voltage buffer (VB) and a source driver (S-IC) are two separate and distinct ICs. Generally, when attempting to adjust a gamma reference voltage on a display panel, the gamma reference voltage is provided by the voltage buffer IC (integrated circuit) to the source driver IC.

FIG. 1 is a block diagram illustrating a programmable voltage buffer and a source driver in conventional art. Referring to FIG. 1, a timing controller 110 is coupled to a plurality of source drivers 110_1, 100_2 to 100_N. A pixel data 102 is transmitted correspondingly from the timing controller 110 to each of the source drivers 100_1 to 100_N via a data bus 104. The voltage buffer VB may provide a gamma reference voltage 106 to the source drivers 100_1 to 100_N. The source drivers 100_1 to 100_N receives the gamma reference voltage 106 to generate a drive voltage 108 to a display panel 150.

However, when a liquid crystal display is displaying an image, a frequent changes of characteristics of the reference voltage 106 (i.e. changing of gamma curve) is required to optimize display quality of the image. In some cases, different gamma curves are even required in different portions of the same frame for displaying specific images. In view of the FIG. 1, all of the source drivers 100_1 to 100_N in conventional art receive the same gamma reference voltage provided by an external voltage buffer VB, it is obvious that the conventional source driver does not meet the requirements as mentioned above.

SUMMARY OF THE INVENTION

According to one embodiment in the invention, a source driver is provided. The source driver is integrated with a programmable voltage buffer unit to dynamically and instantly change voltage configurations controlled by a timing controller while reducing costs.

According to one embodiment in the invention, a method of updating a gamma curve is provided. Different gamma curves are generated based on different display characteristics by generating and adjusting different reference voltage group.

According to one embodiment of the invention, a source driver including at least a first drive channel circuit, a voltage controller and a first programmable voltage buffer unit is provided. The first drive channel circuit is configured for receiving a first pixel data from the timing controller via a data bus, converting the first pixel data to a first drive voltage according to a first reference voltage group and driving a first data line of a display panel by the first drive voltage. The voltage controller receives a voltage command from the timing controller via a data bus, generates and changes a first reference voltage configuration data according to the voltage command. The first programmable voltage buffer unit is coupled to the voltage controller and the first drive channel circuit and configured for receiving the first reference voltage configuration data to generate and adjust a first reference voltage group for applying to the first drive channel circuit.

According to one embodiment of the invention, a method of updating a gamma curve is provided, including: transmitting a voltage command to a source driver during a line data transmitting period, a horizontal blanking period or a vertical blanking period. Generating and adjusting a first reference voltage group by the source driver according to the voltage command for applying to at least a first drive channel circuit of the source driver.

In another embodiment of the invention, in which according to the voltage command, the voltage controller divides a frame period into at least a first line group period and a second line group period, and generates the first reference voltage configuration data different from each other respectively during the first line group period and the second line group period, such that a gamma curve of a first horizontal region of the display panel and a gamma curve of a second horizontal region of the display panel are respectively updated to a first gamma curve and a second gamma curve different from each other.

In another embodiment of the invention, the voltage controller further generates and changes a second reference voltage configuration data according to the voltage command, in which the source driver further includes a second drive channel circuit and a second programmable voltage buffer unit. The second drive channel circuit is configured for receiving a second pixel data from the timing controller via the data bus, converting the second pixel data to a second drive voltage according to a second reference voltage group and driving a second data line of a display panel by the second drive voltage. The second programmable voltage buffer unit is coupled to the voltage controller and the second drive channel circuit and configured for receiving the second reference voltage configuration data to generate and adjust the second reference voltage group for applying to the second drive channel circuit.

According to yet another embodiment of the invention, in said source driver, according to the voltage command, the voltage controller divides the display panel into at least a first vertical region and a second vertical region, and respectively generates the first reference voltage configuration data and the second reference voltage configuration data different from each other, such that a gamma curve of the first vertical region of the display panel and a gamma curve of the second vertical region of the display panel are respectively updated into a first gamma curve and a second gamma curve different from each other.

According to yet another embodiment of the invention, in said source driver, according to the voltage command, the voltage controller generates the first reference voltage configuration data and the second reference voltage configuration data which are the same, and changes the first reference voltage configuration data and the second reference voltage configuration data during a vertical blanking period, such that an image is displayed by all region of the display panel during a new frame period according to a new gamma curve.

According to one embodiment of the present invention, in said source driver, the first programmable voltage buffer unit includes a first resistor and a plurality of digital-to-analog converters (DACs). Said first resistor string is configured for dividing a power voltage into a plurality of divided voltages. The plurality of DACs are coupled to the first resistor string and configured for respectively receiving a corresponding data among the first reference voltage configuration data and respectively converting the corresponding data into a reference voltage according to the plurality of divided voltages, in which the reference voltages output from the DACs are used as the first reference voltage group.

According to one embodiment of the present invention, in said source driver, the first programmable voltage buffer unit further includes a second resistor string. The second resistor string has a plurality of voltage-dividing nodes, in which each of the voltage-dividing nodes is correspondingly coupled to an output terminal in one of the DACs.

Based on above, the embodiments of the invention may achieve a cost saving effect by adjusting the voltage buffer unit and the source driver to be integrated into the same IC. The timing controller controls the source drivers respectively, to dynamically and instantly change the voltage configurations thereof. Therefore, the source driver may provide different gamma curves based on difference of the image characteristics in regions of the display panel.

To make the above features and advantages of the invention more comprehensible, several embodiments accompanied with drawings are described in detail as follows.

DESCRIPTION OF THE EMBODIMENTS

Figure 1:
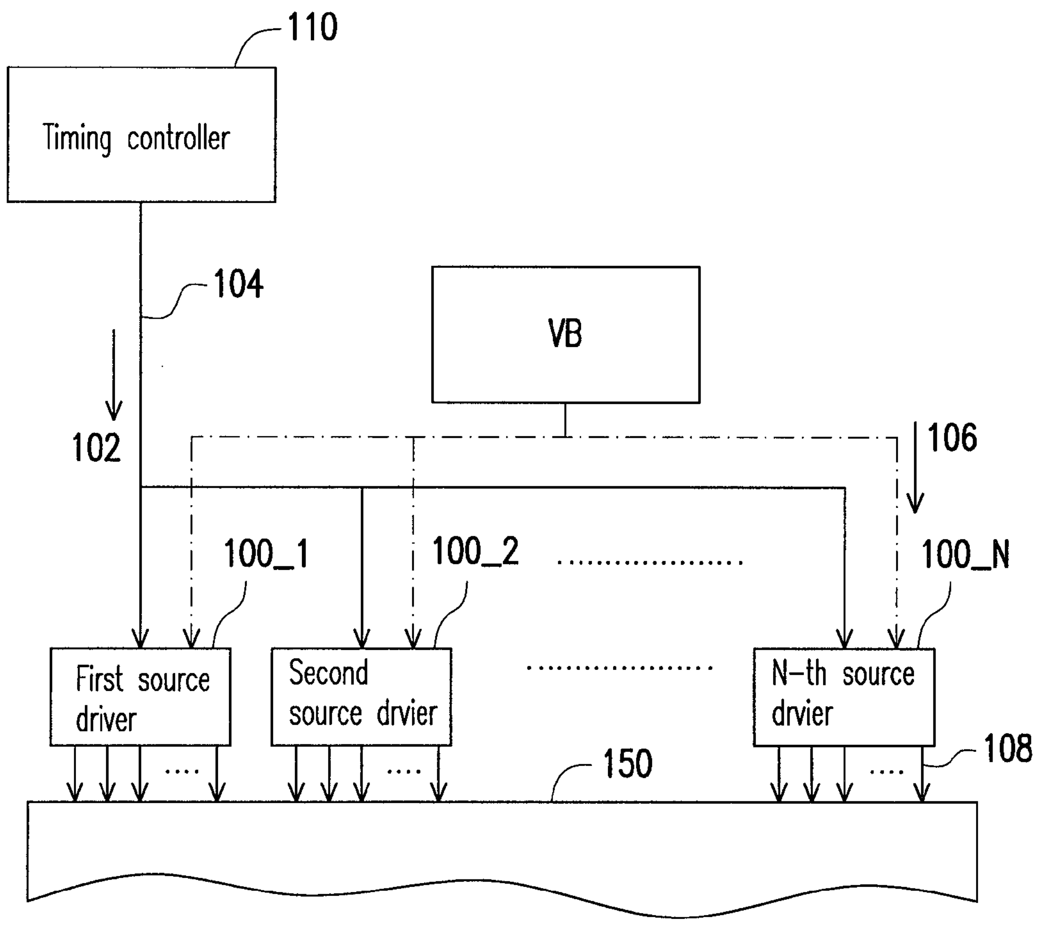
FIG. 1 (Related Art)
FIG. 1 is a block diagram illustrating a programmable voltage buffer and a source driver in conventional art.
Figure 2A:
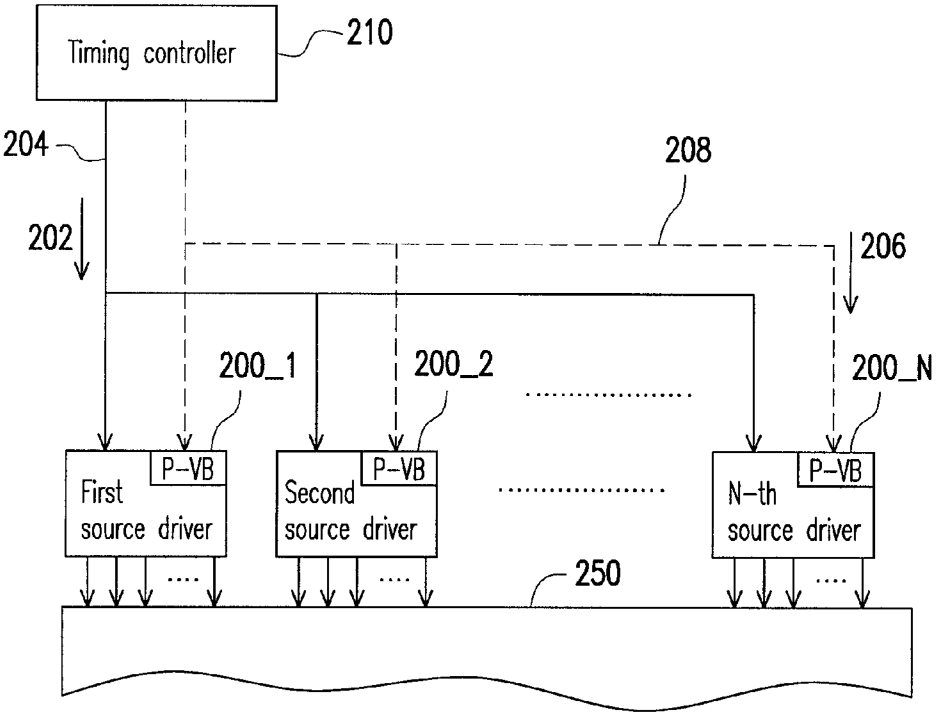
FIG. 2A is a block diagram illustrating a display apparatus according to an embodiment of the invention.

FIG. 2A is a block diagram illustrating a display apparatus according to the embodiment of the invention. Referring to FIG. 2A, a timing controller 210 is coupled to a plurality of source drivers 200_1, 200_2 to 200_N in a multi drop connection. Each of the source drivers is respectively embedded with a programmable voltage generating circuit P-VB. The source drivers 200_1 to 200_N may be different integrated circuits (ICs), or implemented in the same integrated circuit or in the same circuitry, the invention is not limited thereto. Output terminals of the source drivers 200_1 to 200_N are coupled to a display panel 250.

A pixel data 202 is transmitted correspondingly from the timing controller 210 to each of the source drivers 200_1 to 200_N. The pixel data 202 is received by each of the source drivers 200_1 to 200_N via the data bus 204. According to a reference voltage group generated by a programmable voltage generating circuit P-VB in each of the source drivers 200_1 to 200_N, the pixel data 202 is converted to a drive voltage. Lastly, a corresponding data line of the display panel 250 is driven by the source drivers 200_1 to 200_N using the drive voltage. In which, the reference voltage group may be a gamma voltage group generated by the programmable voltage generating circuit P-VB.

A voltage command 206 is transmitted by the timing controller 210 to the programmable voltage generating circuit P-VB in each of the source drivers 200_1 to 200_N via a control bus 208. In which, the voltage command may be a gamma command. When the timing controller attempts to adjust the reference voltage, the voltage command 206 is transmitted to the source drivers 200_1 to 200_N via the control bus 208 to control the programmable voltage generating circuits P-VB in the source drivers 200_1 to 200_N, so that the reference voltages in the source drivers 200_1 to 200_N may be changed. The timing controller 210 controls the source drivers 200_1 to 200_N, respectively, to dynamically and instantly change the voltage configurations thereof. Therefore, under control by the timing controller 210, the source drivers 200_1 to 200_N may provide different gamma curves according to the different characteristics in all (or partial) regions of the display panel.

Figure 2B:
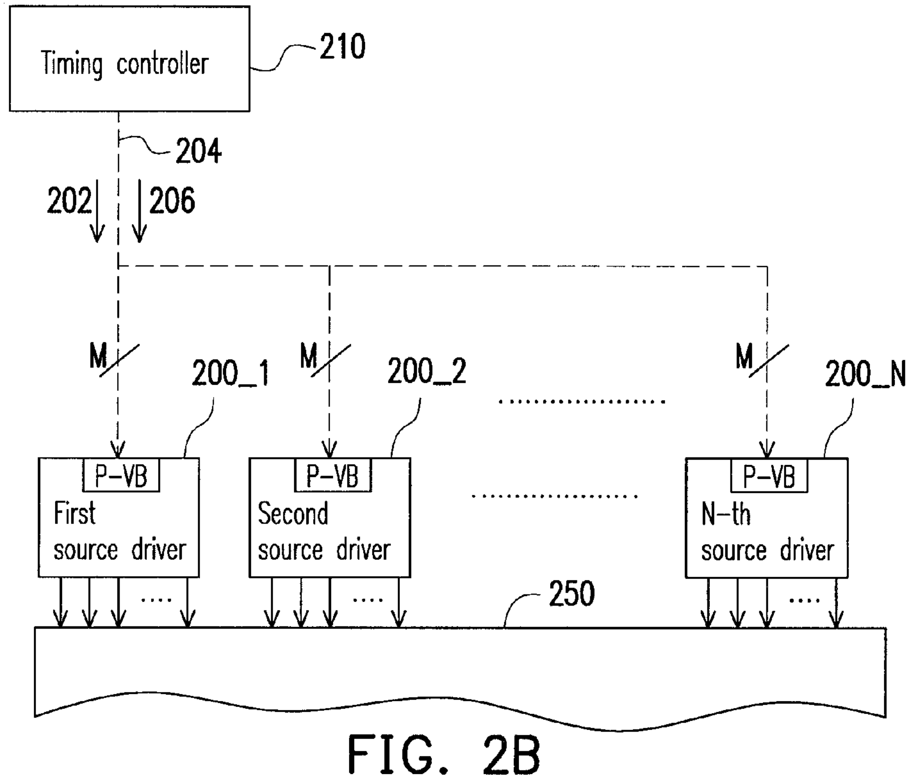
FIG. 2B is a block diagram illustrating a display apparatus according to another embodiment of the invention.

FIG. 2B is a block diagram illustrating a display apparatus according to another embodiment of the invention. Instead of transmitting the voltage command via the control bus 208 (as illustrated in FIG. 2A), the timing controller 210 may also transmit the voltage command 206 to the programmable voltage generating circuit P-VB in each of the source drivers 200_1 to 200_N via the data bus 204 which has been used for transmitting the pixel data as illustrated in FIG. 2B. The embodiment of FIG. 2B may refer to related description for FIG. 2A. In which, the pixel data 202 and the voltage command 206 illustrated in FIG. 2B are both belong to a M-bit signal, and the pixel data 202 and the voltage command 206 may be a serial/parallel signal. According to the embodiment illustrated in FIG. 2B, the voltage configurations are dynamically and instantly changed by the source drivers 200_1 to 200_N according to the voltage command 206. Therefore, under control by the timing controller 210, the source drivers 200_1 to 200_N may provide different gamma curves according to the different characteristics in all (or partial) regions of the display panel.

Figure 3:
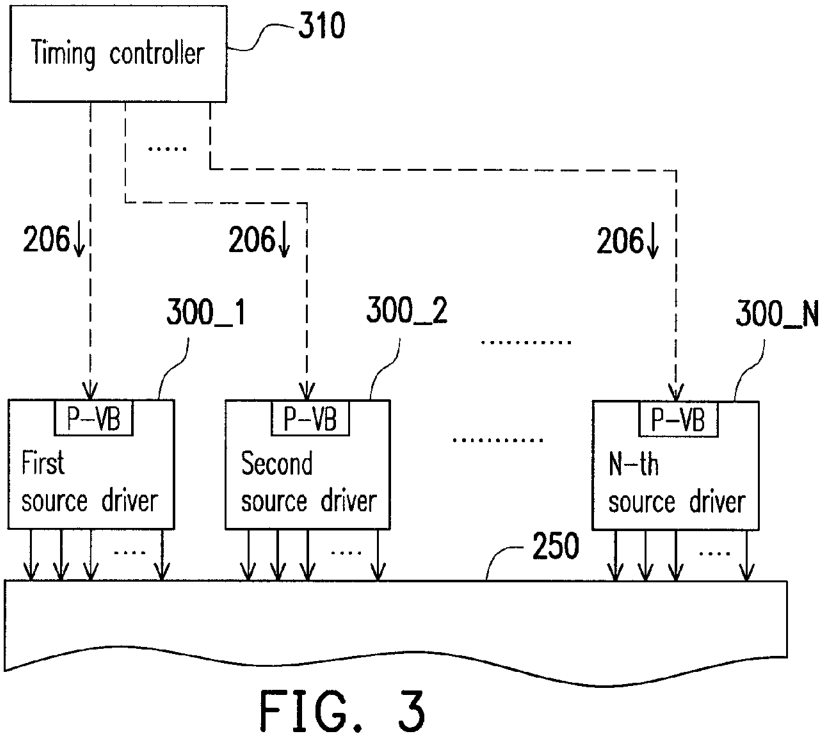
FIG. 3 is a schematic diagram illustrating a display apparatus according to other embodiment of the invention.

However, the method of transmitting the voltage command 206 of the invention is not limited by using the multi drop connection of the embodiment. For example, FIG. 3 is a block diagram illustrating a display apparatus according to another embodiment of the invention. The embodiment of FIG. 3 may refer to related description for FIG. 2A and FIG. 2B. The difference between the embodiments of the FIG. 2A and FIG. 2B lies where the transmission structure of the voltage command 206 between a plurality of the source drivers 300_1 to 300_N an a timing controller 310 in FIG. 3 may also use a Point to Point connection.

Figure 4:
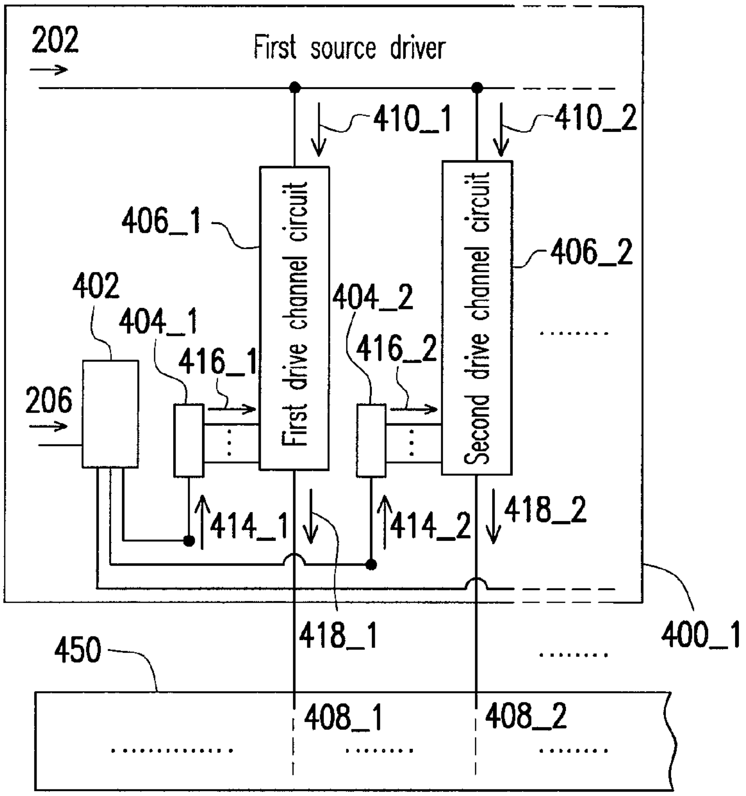
FIG. 4 is a schematic diagram illustrating an internal circuit of a source driver according to another embodiment of the invention.

FIG. 4 is a schematic diagram of an internal circuit of a source driver according the invention. Implementation of the source drivers 200_1 to 200_N in FIG. 2A and FIG. 2B and the source drivers 300_1 to 300_N in FIG. 3 may all refer to related description of the source driver 400_1 illustrated in FIG. 4. The source driver 400_1 includes a plurality of drive channel circuits, for example, the drive channel circuits 406_1 and 406_2 illustrated in FIG. 4. In addition, the source driver 400_1 includes at least one programmable voltage generating circuit P-VB (P-VB may refer to the related description for FIG. 2A, FIG. 2B and FIG. 3), in which the programmable voltage generating circuit P-VB includes one voltage controller and at least one programmable voltage buffer unit. For example, the source driver 400_1 of FIG. 4 includes a programmable voltage buffer unit 404_1, a programmable voltage buffer unit 404_2 and one voltage controller 402. In which, the voltage controller in source driver 400_1 may be a gamma controller.

For the clarity and simplicity, it is illustrated with each of the programmable voltage buffer units being coupled to one drive channel circuit only, the invention is not limited thereto. In other embodiments, each of the programmable voltage buffer units may respectively couple a plurality of drive channel circuits to provide the reference voltage group.

Referring to FIG. 4, the timing controller may transmit the voltage command 206 to the voltage controller 402 via a data bus or a control bus during a line data transmitting period, a horizontal blanking period and a vertical blanking period. A first reference voltage configuration data 414_1 is generated by the voltage controller 402 according to the voltage command 206 for applying to a first programmable voltage buffer unit 404_1. In some embodiments, the first reference voltage configuration data 414_1 and/or the other reference voltage configuration data (such as element 414_2) are updated by the voltage controller 402 during a specific period according to the voltage command 206. In which, the first reference voltage configuration data or other reference voltage configuration data (such as element 414_2) may be a first gamma configuration data or other gamma configuration data.

The first programmable voltage buffer unit 404_1 receives the first reference voltage configuration data 414_1, generates and changes a first reference voltage group 416_1 according to the first reference voltage configuration data 414_1, and provides the first reference voltage group 416_1 to the first drive channel circuit 406_1. The pixel data 202 includes a first pixel data 404_1 and a second pixel data 410_2. The time controller transmits the first pixel data 410_1 to the first drive channel circuit 406_1 via the data bus. The first drive channel circuit 406_1 converts the first pixel data 410_1 to a first drive voltage 418_1 according to the first reference voltage group 416_1. The drive channel circuit 406_1 drives a first data line 408_1 of the display panel 450 by using the first drive voltage 418_1.

Similarly, the voltage controller 402 generates a second reference voltage configuration data 414_2 according to the voltage command 206 for applying to a second programmable voltage buffer unit 404_2. The second programmable voltage buffer unit 404_2 receives the second reference voltage configuration data 414_2, generates and changes a second reference voltage group 416_2 according to the second reference voltage configuration data 414_2, and provides the second reference voltage group 416_2 to the second drive channel circuit 406_2. The time controller transmits the second pixel data 410_2 to the second drive channel circuit 406_2 via the data bus. The second drive channel circuit 406_2 converts the second pixel data 410_2 to a second drive voltage 418_2 according to the second reference voltage group 416_2. The second drive channel circuit 406_2 drives a second data line 408_2 of the display panel 450 by using the second drive voltage 418_2. Method for operating the rest of drive channel circuits in the first source driver 400_1 is identical to the above method, so that related description is omitted hereinafter.

Figure 5:
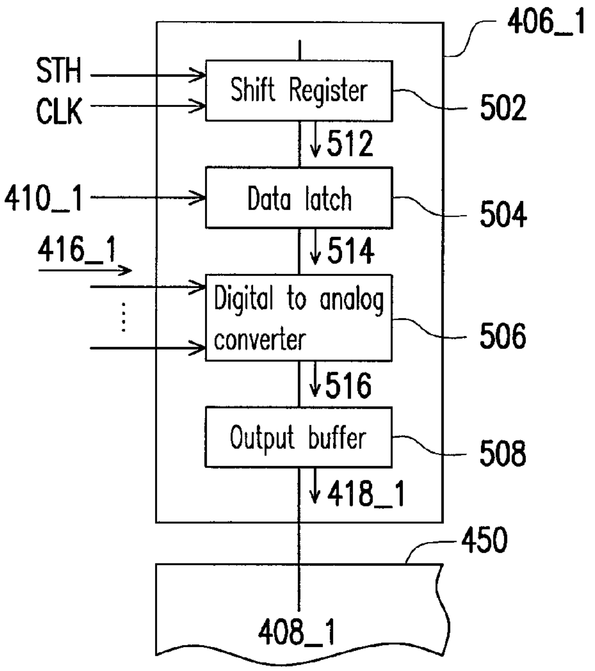
FIG. 5 is a schematic diagram illustrating an internal circuit of a drive channel circuit in a source driver.

FIG. 5 is a schematic diagram illustrating an internal circuit of a drive channel circuit 406_1 in the source driver of FIG. 4 according to embodiments of the invention. Only the drive channel circuit 406_1 is selected among all drive channel circuits in FIG. 5 to represent each of other drive channel circuits. Referring to FIG. 5, the first drive channel circuit 406_1 includes: a shift register 502, a data latch 504, a digital to analog converter (DAC) 506 and an output buffer 508. The shift register 502 receives a horizontal start pulse STH and a clock signal CLK output by the timing controller to provide a latch timing to the data latch 504. The data latch 504 latches the pixel data 410_1 according to the latching timing of the shift register 502 and outputs the latch data 514 to the DAC 506. The DAC 506 selects one of gray voltages from the first reference voltage group 416_1 according to the latch data 514. Therefore, the DAC 506 may convert the latch data 514 to an analog drive signal 516. The output buffer 508 receives and enhances/gains the drive signal 516 to output the first drive voltage 418_1 to the first data line 408_1 of the display panel 450. In the present embodiment, persons having ordinary skill in the art should understand internal circuit and detailed operation of the each unit in said drive channel circuit, so related description is omitted herein.

Figure 6:
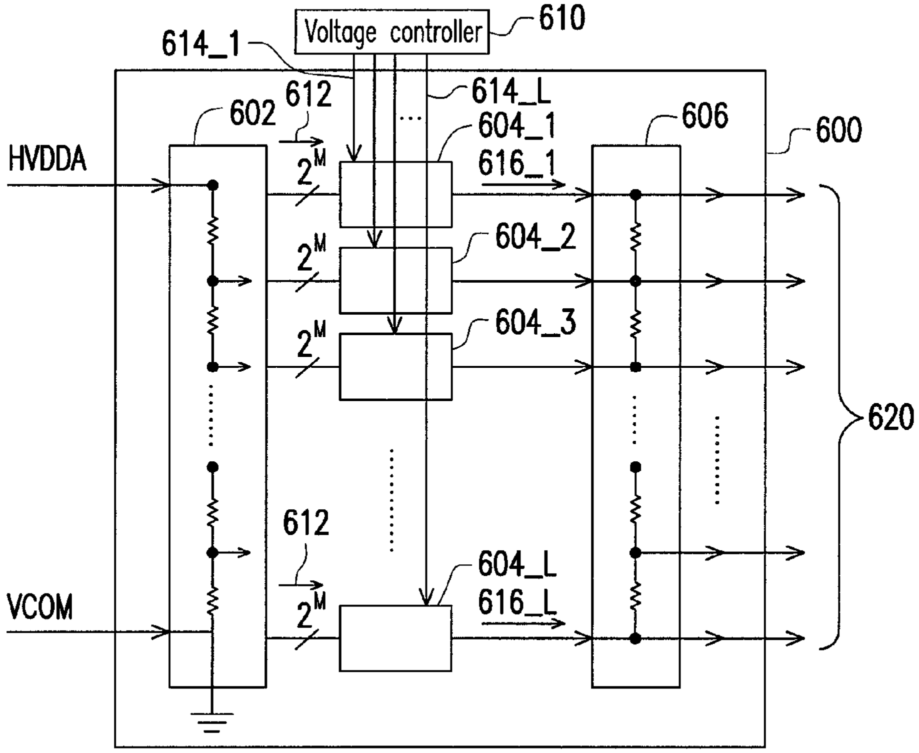
FIG. 6 is a schematic diagram illustrating an internal circuit of a programmable voltage buffer unit according to the invention.

FIG. 6 is a schematic diagram of an internal circuit of a programmable voltage buffer unit 600. The programmable voltage buffer units 404_1, 404_2 and the voltage controller 402 illustrated in FIG. 4 may be implemented by referring to related description of a programmable voltage buffer unit 600 and a voltage controller 610 illustrated in FIG. 6. Referring to FIG. 6 the programmable voltage buffer unit 600 includes a plurality of DACs 601_1, 601_2, 601_3, . . . , 604_L. The programmable voltage buffer unit 600 further includes a first resistor string 602 and a second resistor string 606, in which the DACs 604_1 to 604_L are M-bit DACs. For the clarity and simplicity, it is described by using only one programmable voltage buffer unit 604_1, the invention is not limited thereto. Detailed description of the DACs 604_2 to 604_L may refer to related description for the DAC 604_1. The first resistor string 602 is coupled to a reference voltage terminal of the DAC 604_1, an output terminal and an input terminal of the DACs are respectively coupled to the voltage controller 610 and the second resistor string 606.

Referring to FIG. 6, the first resistor string 602 is used to divide input power voltages HVDDA and VCOM into divided voltages 612 having $2^M$ voltage levels and output the divided voltages 612 to the DAC 604_1. The DAC 604_1 receives a corresponding reference voltage configuration data 614_1 among the reference voltage configuration data 614_1 to 614_L from the voltage controller 610. According to the divided voltages 612 provided by the first resistor string 602, the DAC 604_1 converts the corresponding reference voltage configuration data 614_1 to a reference voltage 616_1. Similarly, the DAC 604_L converts the corresponding reference voltage 614_L to a reference voltage 616_L. A plurality of voltage-dividing nodes of the second resistor string 606 is respectively coupled to the output terminal of one of the DACs 604_1 to 604_L. The second resistor string 606 divides a plurality of reference voltages 616_1 to 616_L output by the DACs 604_1 to 604_L to output a reference voltage group 620. The reference voltage group 620 may be provided to the drive channel circuits of the source driver.

According to other embodiments, the second resistor string 606 may be omitted. In the case where the second resistor string 606 is omitted, analog voltages output by the DACs 604_1 to 604_L may be used as the reference voltage group 620 of the programmable voltage buffer unit 600.

Figure 7:
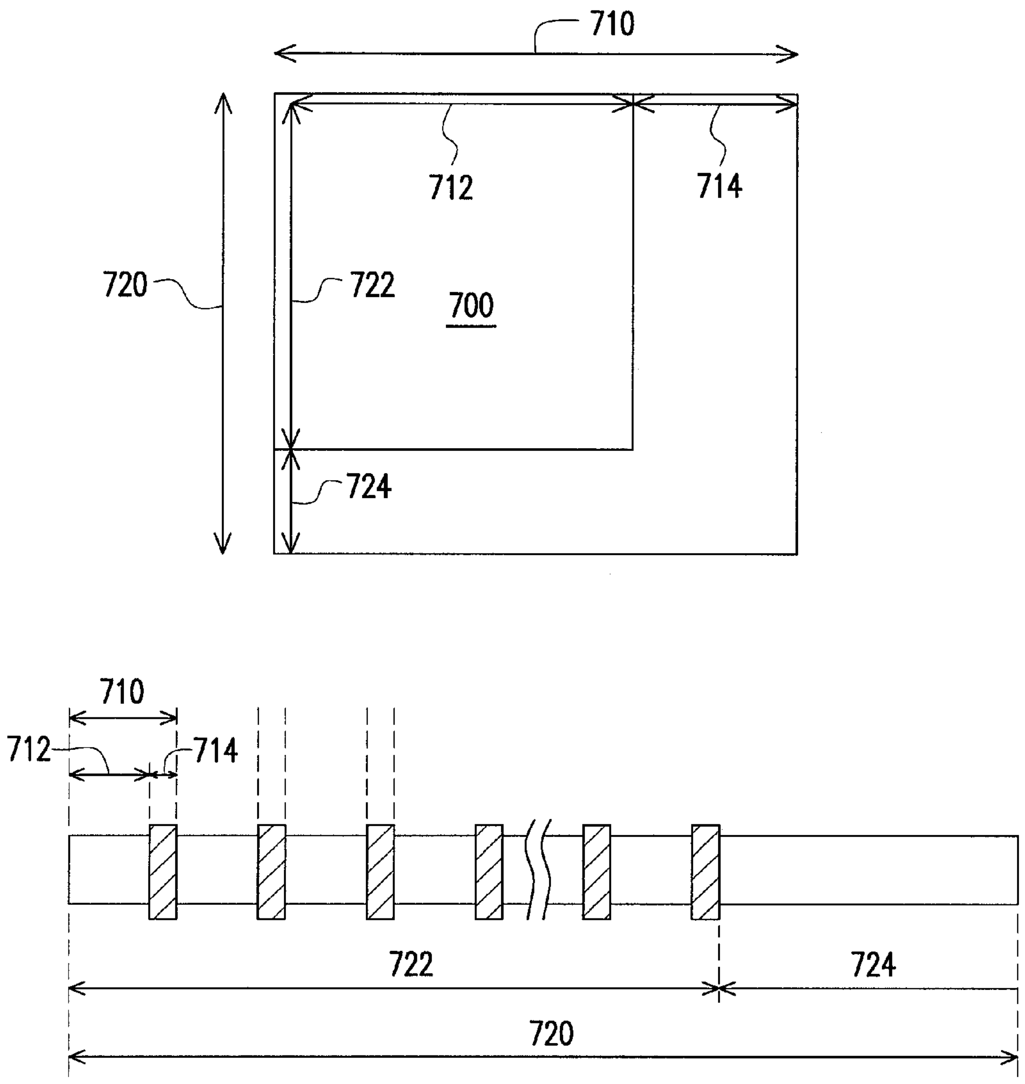
FIG. 7 is a diagram of time relation and clocking when the timing controller is transmitting data to the source driver according to embodiments of invention.

FIG. 7 is a diagram illustrating a time relation and a data clocking diagram when the timing controller is transmitting data to the source driver. Referring to the time relation and the data clocking diagram of FIG. 7, one horizontal total (H-Total) period 710 is obtained by combining one line data transmitting period (also known as a horizontal active (H-Active) period) 712 and one horizontal blanking (H-Blanking) period 714. One vertical active (V-Active) period 722 is obtained by combining multiple horizontal total periods 710. During one vertical active period 722, an active area 700 may be obtained by combining all of the line data transmitting periods 712. One vertical total (V-Total) period 720 is obtained by combining one vertical blanking (V-Blanking) period 724 and one vertical active period 722. One vertical total period 720 is also known as one frame period.

Figure 8:
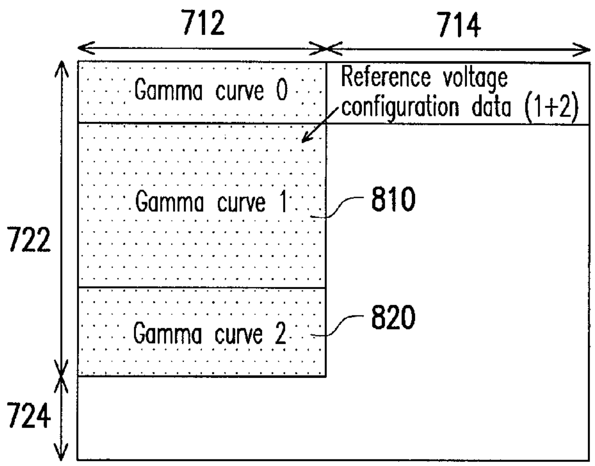
FIG. 8 is a diagram illustrating a time relation when using a method of updating a gamma curve according to the first embodiment of the invention.

FIG. 8 is a diagram illustrating a time relation when updating a gamma curve according to the first embodiment. The embodiment of FIG. 8 may refer to related description for FIG. 7. Referring to FIG. 4 and FIG. 8 together. It is assumed that, as controlled by the voltage controller 402, the reference voltage groups 416_1 and 416_2 during the initial active period matches a gamma curve 0. When the voltage command of the timing controller is received by the voltage controller 402 during the horizontal banking period 714, the voltage controller 402 may divide one frame period into at least a first line group period 810 and a second line group period 820 according to the voltage command, and generates a reference voltage configuration data 1 and a reference voltage configuration data 2 which are different from each other respectively during the first line group period 810 and the second line group period 820 as for applying to the programmable voltage buffer units 404_1 and 404_2, respectively. Therefore, during the vertical active period 722, the programmable voltage buffer units 404_1 and 404_2 may adjust the reference voltage groups 416_1 and 416_2 during the first line group period 810 according to the updated reference voltage configuration data, so as to match a first gamma curve 1. Similarly, the programmable voltage buffer units 404_1 and 404_2 may adjust the reference voltage groups 416_1 and 416_2 during the second line group period 820 according to the updated reference voltage configuration data, so as to match a second gamma curve 2. Therefore, the drive channel circuits 406_1 and 406_2 may respectively update a gamma curve of the first horizontal region and a gamma curve of the second horizontal region in the display panel 450 to the gamma curve 1 and the gamma curve 2 (which are different from each other).

Figure 9:
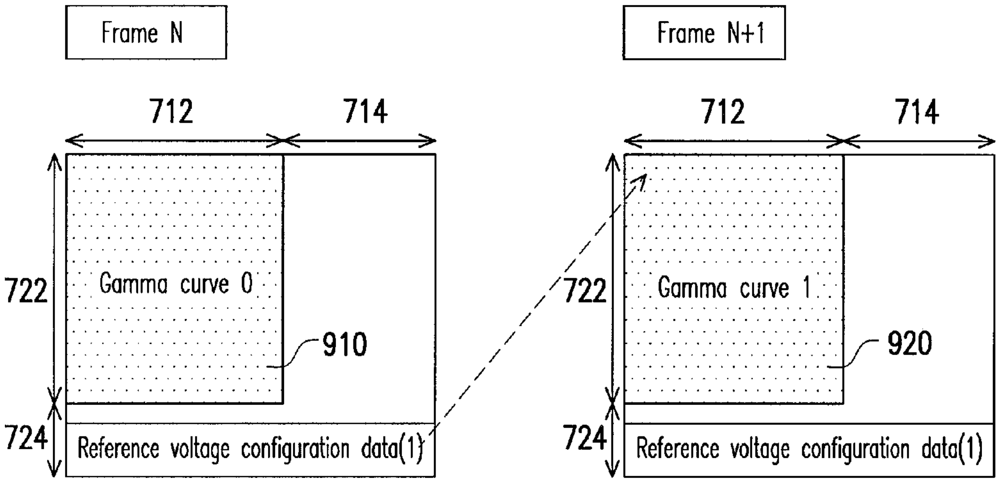
FIG. 9 is a diagram illustrating a time relation when using a method of updating gamma curve according to the second embodiment of the invention.

FIG. 9 is a diagram illustrating a time relation when updating a gamma curve according to the second embodiment. The embodiment of FIG. 9 may refer to related description for FIG. 7. Referring to FIG. 4 and FIG. 9 together, it is assumed that the reference voltage groups 416_1 and 416_2 in the active area 910 of the previous frame matches the gamma curve 0. When the voltage command of the timing controller is received by the voltage controller 402 during the vertical blanking period 724, the voltage controller 402 may control the programmable voltage buffer units 404_1 and 404_2 according to the voltage command to change the reference voltage groups 416_1 and 416_2 in the active area 920 of the next frame, so as to match the gamma curve 1. Therefore, the drive channel circuits 406_1 and 406_2 may update a gamma curve of the active area 920 in the next frame to the gamma curve 1 according to the updated reference voltage configuration data.

Figure 10:
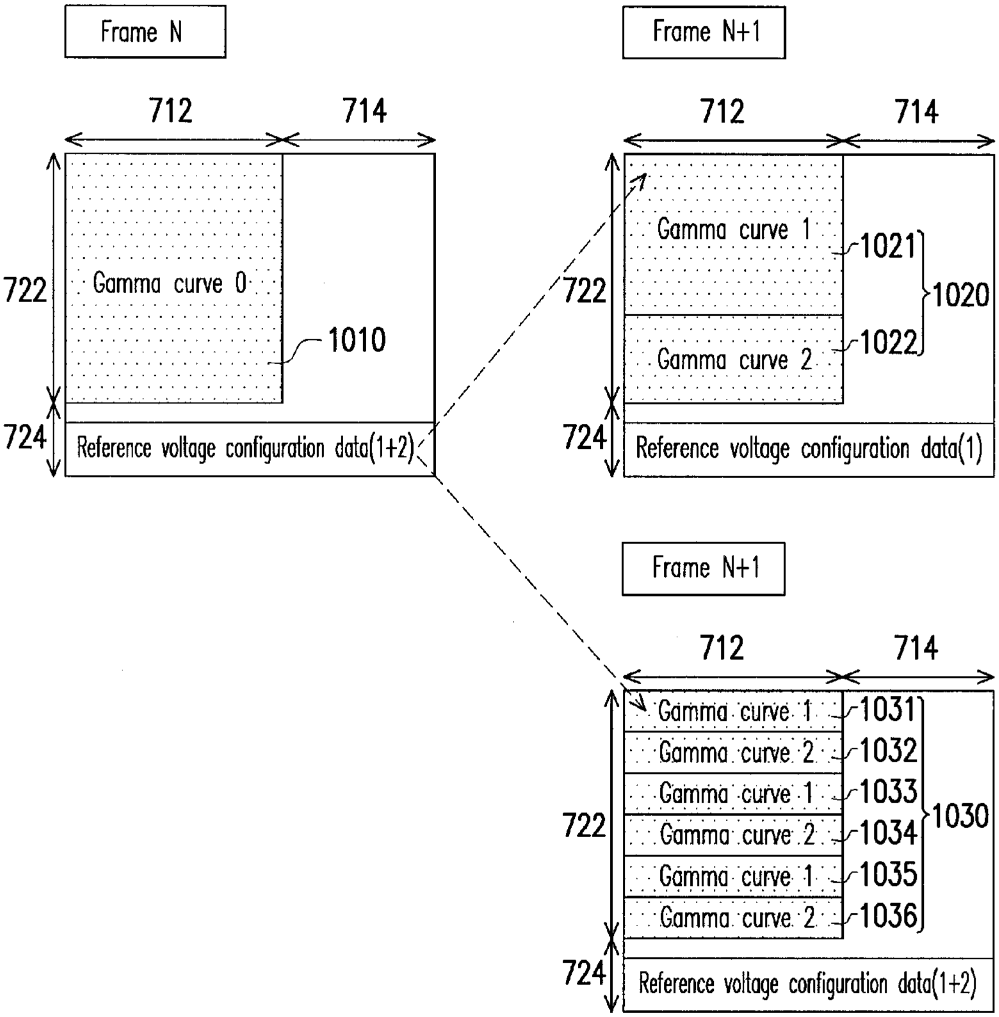
FIG. 10 is a diagram illustrating a time relation when using a method of updating gamma curve according to the third embodiment of the invention.

FIG. 10 is a diagram illustrating a time relation when updating a gamma curve according to the third embodiment. The embodiment of FIG. 10 may refer to related description for FIG. 7. Referring to FIG. 4 and FIG. 10 together, it is assumed that the reference voltage groups 416_1 and 416_2 in the active area 1010 of the previous frame matches the gamma curve 0. When the voltage command of the timing controller is received by the voltage controller 402 during the vertical blanking period 724, the voltage controller 402 may control the programmable voltage buffer units 404_1 and 404_2 according to the voltage command to change the reference voltage groups 416_1 and 416_2 in the active area 1020 of the next frame. For example, the voltage controller 402 may control the programmable voltage buffer units 404_1 and 404_2 to change the reference voltage groups 416_1 and 416_2 respectively during the first line group period 1021 and the second line group period 1022 in the active area 1020 of the next frame. Therefore, the gamma curve during the first line group period 1021 is updated to the gamma curve 1, and the gamma curve during the second line group period 1022 is updated to the gamma curve 2.

As for another example, the voltage controller 402 may control the programmable voltage buffer units 404_1 and 404_2 according to the voltage command to change the reference voltage groups 416_1 and 416_2 respectively during a plurality of line group periods 1031 to 1036 in the active area 1030 of the next frame. Therefore, gamma curves during the first line group period 1031, the third line group period 1033 and the fifth line group period 1035 are updated to the gamma curve 1, whereas gamma curves during the second line group period 1302, the fourth line group period 1304 and the sixth line group period 1036 are updated to the gamma curve 2.

Figure 11:
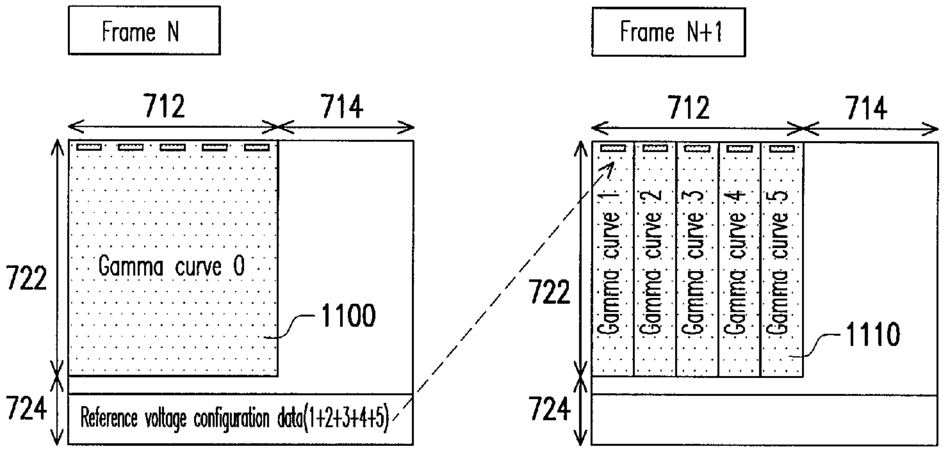
FIG. 11 is a diagram illustrating a time relation when using a method of updating gamma curve according to the fourth embodiment of the invention.

FIG. 11 is a diagram illustrating a time relation when updating a gamma curve according to the fourth embodiment. The embodiment of FIG. 11 may refer to related description for FIG. 7. Referring to FIG. 4 and FIG. 11 together, it is assumed that the reference voltage groups 416_1 and 416_2 in the active area 1100 of the previous frame matches the gamma curve 0. In the present embodiment, the first reference voltage configuration data 414_1 and the second reference voltage configuration data 414_2 (which are the same) may be generated by the voltage controller 402 according to the voltage command. When the voltage command of the timing controller is received by the voltage controller 402 during the vertical blanking period 724, the voltage controller 402 may change the first reference voltage configuration data 414_1 and the second reference voltage configuration data 414_2 during the vertical blanking period 724 according to the voltage command. Therefore, in the active area 1110 of the next new frame, all regions driven by the source driver 400_1 in the active area of the display panel 450 may display images according to the new gamma curve. Each of different source drivers may drive the display panel 450 using different gamma curves according to the voltage command. For example, the first source driver uses the gamma curve 1 to drive the display panel, the second source driver uses the gamma curve 2 to drive the display panel, the third source driver uses a gamma curve 3 to drive the display panel, the fourth source driver uses the gamma curve 4 to drive the display panel and the fifth source driver uses the gamma curve 5 to drive the display panel.

Figure 12:
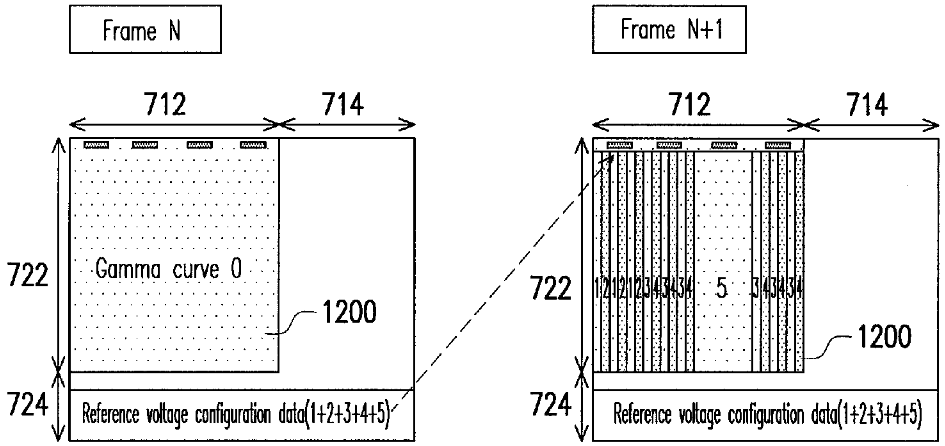
FIG. 12 is a diagram illustrating a time relation when using a method of updating gamma curve according to the fifth embodiment of the invention.

FIG. 12 is a diagram illustrating a time relation when updating a gamma curve according to the fifth embodiment. The embodiment of FIG. 12 may refer to related description for FIG. 7. Referring to FIG. 4 and FIG. 12 together, it is assumed that the reference voltage groups 416_1 and 416_2 in the active area 1200 of the previous frame matches the gamma curve 0. When the voltage command of the timing controller is received by the voltage controller 402 during the vertical blanking period 724, the voltage controller 402 divides the display panel 450 into at least a first vertical region and a second vertical region, and respectively generates the first reference voltage configuration data 414_1 and the second reference voltage configuration data 414_2 (which are different from each other), such that a gamma curve of the first vertical region of the display panel and a gamma curve of the second vertical region of the display panel are respectively updated to a first gamma curve and a second gamma curve (which are different from each other). As illustrated in FIG. 12, the first source driver divides the display panel 450 into at least six vertical regions according to the voltage command, in which the first, the third and the fifth vertical regions use the gamma curve 1, and the second, the fourth and the six vertical regions use the gamma curve 2. Similarly, the rest of source drivers divide the display panel 450 into a plurality of vertical regions (which are different from each other), in which each of the vertical regions uses a different gamma curve. For example, the second source driver drives a seventh, a eighth, a ninth, a tenth, a eleventh and a twelfth vertical regions of the display panel 450, in which the seventh, the ninth and the eleventh vertical regions use the gamma curve 3, and the eighth, the tenth and the twelfth vertical regions use the gamma curve 4. As for another example, the third source driver drives a thirteenth vertical region of the display panel 450, in which the thirteenth vertical region uses the gamma curve 5.

Figure 13:
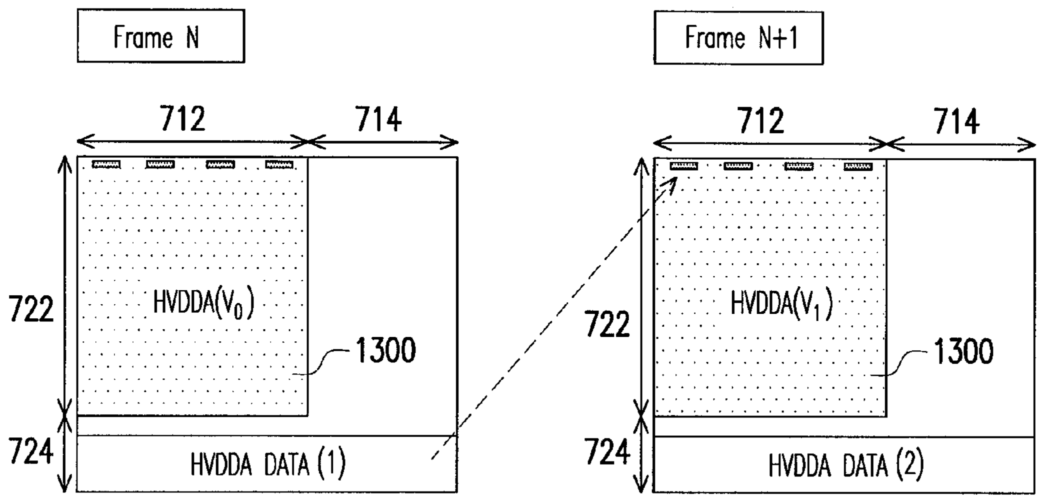
FIG. 13 is a diagram illustrating a time relation when using a method of updating HVDDA voltage according to the sixth embodiment of the invention.

FIG. 13 is a diagram illustrating a time relation when updating a HVDDA voltage according to the sixth embodiment. The embodiment of FIG. 13 may refer to related description for FIG. 7. Referring to FIG. 4, FIG. 6 and FIG. 13 together, it is assumed that in the active area 1300 of the previous frame, a voltage HVDDA of system is $V_0$. When the voltage command of the timing controller is received by the source driver 400_1 during the vertical blanking period 724, the source driver 400_1 may change a level of the voltage HVDDA according to the voltage command. Therefore, in the active area 1300 of the next frame, the programmable voltage buffer unit of the source driver 400_1 may generate a corresponding reference voltage according to the updated voltage HVDDA (with voltage level being $V_1$).

Figure 14:
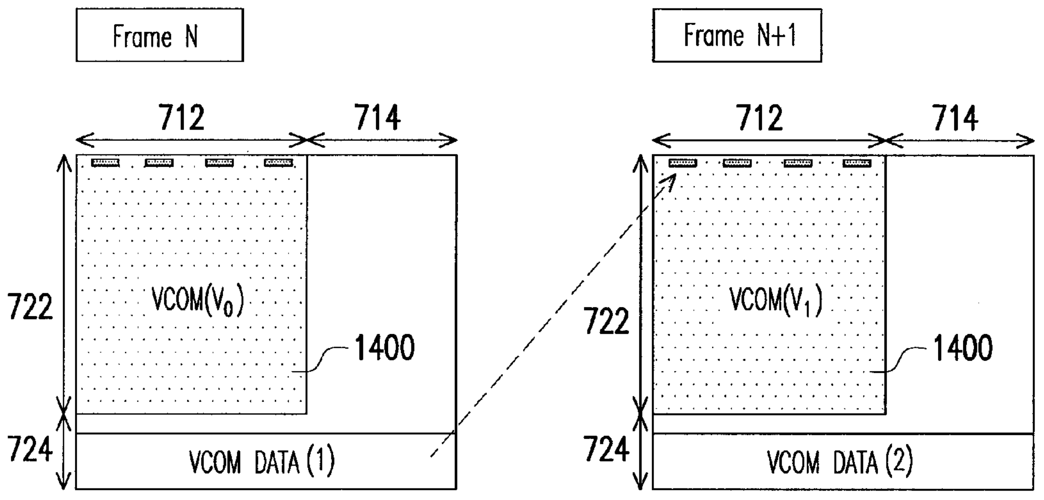
FIG. 14 is a diagram illustrating a time relation when using a method of updating VCOM voltage according to the seventh embodiment of the invention.

FIG. 14 is a diagram illustrating a time relation when updating a HVDDA voltage according to the seventh embodiment. The embodiment of FIG. 14 may refer to related description for FIG. 7. Referring to FIG. 4, FIG. 6 and FIG. 14 together, it is assumed that in the active area 1400 of the previous frame, a voltage VCOM of system is $V_0$. When the voltage command of the timing controller is received by the source driver 400_1 during the vertical blanking period 724, the source driver 400_1 may change a level of the voltage VCOM according to the voltage command. Therefore, in the active area 1400 of the next frame, the programmable voltage buffer unit of the source driver 400_1 may generate a corresponding reference voltage according to the updated voltage VCOM (with voltage level being $V_1$).

In view of above, the embodiments of the invention may integrate the source driver and the programmable voltage generating circuit P-VB on the same IC to achieve cost saving. In addition, the timing controller in the said embodiments may transmit the voltage command to the source driver during any period (e.g., the line data transmitting period, the horizontal blanking period and the vertical blanking period) via various paths. Therefore, as illustrated in above embodiments, different source driver IC may output drive voltages having different gamma curves, or different output terminals of the same source driver IC may have characteristics of outputting the drive voltage having different gamma curves. In other words, the source driver in the above embodiments may divide the display panel into a plurality of vertical regions, and the respectively updating the gamma curves in different vertical regions to gamma curves which are different from each other. Moreover, as illustrated in above embodiments, the source driver may divide the display panel into a plurality of horizontal regions, and the respectively updating the gamma curves in different horizontal regions to gamma curves which are different from each other. Therefore, the source driver in above embodiments may locally apply different gamma curves according to image characteristics of different regions in the active area, such that an optimized image may be respectively displayed in different regions of the frame.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A source driver, comprising:

at least a first drive channel circuit, configured for receiving a first pixel data from a timing controller via a data bus, converting the first pixel data to a first drive voltage according to a first reference voltage group, and driving a first data line of a display panel using the first drive voltage;

a voltage controller, configured for receiving a voltage command from the timing controller, generating and changing a first reference voltage configuration data according to the voltage command; and a first programmable voltage buffer unit, coupled to the voltage controller and the first drive channel circuit, configured for receiving the first reference voltage configuration data, generating and adjusting the first reference voltage group for applying to the first drive channel circuit according to the first reference voltage configuration data, wherein the timing controller transmits the voltage command to the source driver via the data bus during a line data transmitting period, a horizontal blanking period or a vertical blanking period.

2. The source driver of claim 1, wherein the voltage controller updates the first reference voltage configuration data during a specific period according to the voltage command.

3. The source driver of claim 1, wherein according to the voltage command, the voltage controller divides a frame period into at least a first line group period and a second line group period, and generates the first reference voltage configuration data different from each other respectively during the first line group period and the second line group period, such that a gamma curve of a first horizontal region of the display panel and a gamma curve of a second horizontal region of the display panel are respectively updated to a first gamma curve and a second gamma curve different from each other.

4. The source driver of claim 1, wherein the voltage controller further generates and changes a second reference voltage configuration data according to the voltage command, the source driver further comprises:

a second drive channel circuit, configured for receiving a second pixel data from the timing controller via the data bus, converting the second pixel data to a second drive voltage according to a second reference voltage group, and driving a second data line of the display panel by using the second drive voltage; and a second programmable voltage buffer unit, coupled to the voltage controller and the second drive channel circuit, configured for receiving the second reference voltage configuration data to generate and adjust the second reference voltage group for applying to the second drive channel circuit.

5. The source driver of claim 4, wherein according to the voltage command, the voltage controller divides the display panel into at least a first vertical region and a second vertical region, and respectively generates the first reference voltage configuration data and the second reference voltage configuration data different from each other, such that a gamma curve of the first vertical region of the display panel and a gamma curve of the second vertical region of the display panel are respectively updated into a first gamma curve and a second gamma curve different from each other.

6. The source driver of claim 4, wherein according to the voltage command, the voltage controller generates the first reference voltage configuration data and the second reference voltage configuration data which are the same, and changes the first reference voltage configuration data and the second reference voltage configuration data during a vertical blanking period, such that an image is displayed by all region of the display panel during a new frame period according to a new gamma curve.

7. The source driver of claim 1, wherein the first programmable voltage buffer unit comprises:

a first resistor string, configured for dividing a power voltage into a plurality of divided voltages; and a plurality of digital-to-analog converters, coupled to the first resistor string, configured for respectively receiving a corresponding data among the first reference voltage configuration data, and respectively converting the corresponding data into a reference voltage according to the plurality of divided voltages, wherein the reference voltages output from the digital-to-analog converters are used as the first reference voltage group.

8. The source driver of claim 7, wherein the first programmable voltage buffer unit comprises:

a second resistor string having a plurality of voltage-dividing nodes, wherein each of the voltage-dividing nodes is correspondingly coupled to an output terminal in one of the digital-to-analog converters.

9. The source driver of claim 1, wherein the voltage controller receives the voltage command from the timing controller via the data bus.

10. The source driver of claim 1, wherein the voltage controller receives the voltage command from the timing controller via a control bus which is different from the data bus.

11. A method for updating a gamma curve, comprising:

transmitting a voltage command to a source driver during a line data transmitting period, a horizontal blanking period or a vertical blanking period; and generating and adjusting a first reference voltage group by the source driver according to the voltage command for applying to at least a first drive channel circuit of the source driver.

12. The method for updating the gamma curve of claim 11, wherein according to the voltage command, the source driver divides a frame period into at least a first line group period and a second line group period, and generates the first reference voltage configuration data different from each other respectively during the first line group period and the second line group period, such that a gamma curve of a first horizontal region of the display panel and a gamma curve of a second horizontal region of the display panel are respectively updated in a first gamma curve and a second gamma curve different from each other.

13. The method for updating the gamma curve of claim 11, further comprising:

generating and adjusting a second reference voltage group by the source driver according to the voltage command for applying to at least a second drive channel circuit of the source driver.

14. The method for updating the gamma curve of claim 13, wherein according to the voltage command, the source driver divides the display panel into at least a first vertical region and a second vertical region, and respectively generates the first reference voltage group and the second reference voltage group different from each other, such that a gamma curve of the first vertical region of the display panel and a gamma curve of the second vertical region of the display panel are respectively updated to a first gamma curve and a second gamma curve different from each other.

15. The method for updating the gamma curve of claim 13, wherein according to the voltage command, the source driver generates the first reference voltage group and the second reference voltage group which are the same, and changes the first reference voltage group and the second reference voltage group during a vertical blanking period, such that an image is displayed by all region of the display panel during a new frame period according to a new gamma curve.

16. The method for updating the gamma curve of claim 11, wherein the voltage command is transmitted to the source driver via a data bus.

17. The method for updating the gamma curve of claim 11, wherein the voltage command is transmitted to the source driver via a control bus.

* * * * *